US006511580B1

(12) United States Patent
Liu

(10) Patent No.: US 6,511,580 B1
(45) Date of Patent: Jan. 28, 2003

(54) SOFT ABSORBENT TISSUE CONTAINING DERIVITIZED AMINO-FUNCTIONAL POLYSILOXANES

(75) Inventor: Kou-Chang Liu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/003,143

(22) Filed: Nov. 15, 2001

(51) Int. Cl.[7] .......................... D21H 17/59; D21H 21/22
(52) U.S. Cl. .................... 162/164.4; 162/109; 162/111; 162/112; 162/113; 162/135
(58) Field of Search ................................ 162/111, 112, 162/164.4, 109, 135; 427/395; 428/447

(56) References Cited

U.S. PATENT DOCUMENTS

| 4,409,267 A | 10/1983 | Ichinohe et al. |
| 4,614,675 A | 9/1986 | Ona et al. |
| 4,938,832 A | 7/1990 | Schmalz |
| 4,963,432 A | 10/1990 | Fuggini et al. |
| 5,059,282 A | 10/1991 | Ampulski et al. |
| 5,078,747 A | 1/1992 | Kästele et al. |
| 5,098,979 A | 3/1992 | O'Lenick, Jr. |
| 5,164,046 A | 11/1992 | Ampulski et al. |
| 5,215,626 A | 6/1993 | Ampulski et al. |
| 5,246,546 A | 9/1993 | Ampulski |
| 5,281,658 A | 1/1994 | Ona et al. |
| 5,385,643 A | 1/1995 | Ampulski |
| 5,389,204 A | 2/1995 | Ampulski |
| 5,399,612 A | 3/1995 | Calhoun |
| 5,409,620 A | 4/1995 | Kosal et al. |
| 5,518,775 A | 5/1996 | Kosal et al. |
| 5,538,595 A | 7/1996 | Trokhan et al. |
| 5,552,020 A | 9/1996 | Smith et al. |
| 5,567,347 A | 10/1996 | Kosal et al. |
| 5,573,637 A | 11/1996 | Ampulski et al. |
| 5,575,891 A | 11/1996 | Trokhan et al. |
| 5,612,409 A | 3/1997 | Chrobaczek et al. |
| 5,629,088 A | 5/1997 | Ogawa et al. |
| RE35,621 E | 10/1997 | Schmalz |
| 5,707,434 A | 1/1998 | Halloran et al. |
| 5,707,435 A | 1/1998 | Halloran |
| 5,716,704 A | 2/1998 | Ogawa et al. |
| 5,725,736 A | 3/1998 | Schroeder et al. |
| 5,807,956 A | 9/1998 | Czech |
| 5,814,188 A | 9/1998 | Vinson et al. |
| 5,925,469 A | 7/1999 | Gee |
| 5,944,273 A | 8/1999 | Lin et al. |
| 5,981,681 A | 11/1999 | Czech |
| 6,017,417 A | 1/2000 | Wendt et al. |
| 6,030,675 A | 2/2000 | Schroeder et al. |
| 6,048,479 A | 4/2000 | Hashemzadeh |
| 6,054,020 A | 4/2000 | Goulet et al. |
| 6,072,017 A | 6/2000 | Blizzard et al. |
| 6,080,686 A * | 6/2000 | Floyd ....................... 162/164.4 |
| 6,136,215 A | 10/2000 | Evans et al. |
| 6,171,515 B1 | 1/2001 | Evans et al. |
| 6,180,234 B1 * | 1/2001 | Hashemzadeh |
| 6,267,842 B1 * | 7/2001 | Ona et al. ................. 162/164.4 |
| 6,432,270 B1 * | 8/2002 | Liu et al. ................. 162/164.4 |
| 2001/0037100 A1 | 11/2001 | Shanklin |

FOREIGN PATENT DOCUMENTS

| CA | 2202737 A1 | 10/1997 |
| EP | 0 347 154 B1 | 1/1996 |
| EP | 0 803 012 B1 | 6/1999 |
| WO | WO 00/50098 A1 | 8/2000 |
| WO | WO 01/48312 A1 | 7/2001 |

OTHER PUBLICATIONS

Derwent World Patent Database abstract of Toray Dow Corning Silicone Co. Ltd.: Description of JP 63–023976 A2, "Treating Agent for Solid Material."
Derwent World Patent Database abstract of Toray Dow Corning Silicone Co. Ltd.: Description of JP 06–311943 A2, "Silicone Emulsion Composition for Treatment of Wiping Paper."
Derwent World Patent Database abstract of Toray Dow Corning Silicone Co. Ltd.: Description of JP 07–145596 A2, "Composition for Treating Wiping Paper."
Derwent World Patent Database abstract of Toray Dow Corning Silicone Co. Ltd.: Description of JP 2000–154495, "Water–Based Treating Agent for Wiping Off Paper."
Patent Cooperation Treaty Search Report from the International Search Authority, International Application No. PCT/US 02/12072 dated Oct. 15, 2002.

* cited by examiner

Primary Examiner—Peter Chin
(74) Attorney, Agent, or Firm—Gregory E. Croft

(57) ABSTRACT

A tissue product having improved hand feel and good wettability is produced by printing onto one or both sides of the tissue an aqueous emulsion containing a derivitized amino-functional polysiloxane. The derivitized amino-functional polysiloxane structure has one or more pendant groups containing an amine derivative.

32 Claims, 2 Drawing Sheets

SOFT ABSORBENT TISSUE CONTAINING DERIVITIZED AMINO-FUNCTIONAL POLYSILOXANES

BACKGROUND OF THE INVENTION

In the field of soft tissues, such as facial tissue and bath tissue, it is well known that the application of polysiloxanes to the surface of the tissue can impart an improved surface feel to the tissue. However, polysiloxanes are also known to impart hydrophobicity to the treated tissue. Hence, it is difficult to find a proper balance between softness and wettability, both of which are desirable attributes for tissue, particularly bath tissue.

SUMMARY OF THE INVENTION

It has now been discovered that the wettability of a tissue can be improved with minimal negative impact on the surface feel of the tissue by treating one or both outer surfaces of the tissue with a particular group of derivitized amino-functional polysiloxanes. More specifically, suitable polysiloxane structures have one or more pendant groups which contain an amine derivative. A general structure is as follows:

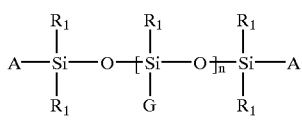

wherein:
"A" is selected from the group consisting of hydroxy; $C_1$–$C_6$ alkyl radical; or C1–C6 alkoxyl radical, which can be straight chain, branched or cyclic, unsubstituted or substituted; or a "B".
$R_1$=a $C_1$–$C_6$ alkyl radical, which can be straight chain, branched or cyclic;
$G=(R_1)_m+(B)_p+(D)_q$ with $R_1$, B and D distributed in random or block fashion;
m=20–100,000;
p=1–5,000;
q=0–5,000;
m+p+q=n;
$B$=—$(R_3$—$N$—$R_4)$—$R_5$—W
wherein
t=0 or 1;
$R_3$=a $C_2$–$C_8$ alkylene diradical, which can be straight chain or branched, substituted or unsubstituted;
$R_4$=a hydrogen or $C_1$–$C_8$ alkyl radical, which can be straight chain or branched, substituted or unsubstituted or a $R_6$;
$R_5$=a $C_2$–$C_8$ alkylene diradical, which can be straight chain or branched, substituted or unsubstituted;
W=—$N$—$R_6R_7$; $OCONR_qR_{10}$;
wherein
$R_6$=a radical of hydrogen, $COOR_8$, or $CONR_9R_{10}$;
$R_7$=a radical $COOR_8$, or $CONR_9R_{10}$;
$R_8$=a $C_1$–$C_{10}$ alkyl radical, which can be straight chain, branched or cyclic, substituted or unsubstituted, aliphatic or aromatic;
$R_9$=hydrogen or a $C_1$–$C_{10}$ alkyl radical, which can be straight chain, branched or cyclic, substituted or unsubstituted, aliphatic or aromatic;
$R_{10}$=hydrogen or a $C_1$–$C_{10}$ alkyl radical, which can be straight chain, branched or cyclic, substituted or unsubstituted, aliphatic or aromatic;

$D$=—$R_{11}$—Y,
wherein
$R_{11}$=a $C_2$–$C_6$ alkylene diradical;
Y=—$NR_{12}R_{13}$, —$OSO_3R_{14}$, or —$[N^+R_{14}R_{16}SO_2PhR_{15}]I^-$ where Ph is a phenyl radical;
wherein
$R_{12}$=hydrogen, $C_1$–$C_8$ alkyl, —$COOR_{16}$, or —$CONR_{17}R_{18}$ radical;
$R_{13}$=hydrogen, $C_1$–$C_8$ alkyl, $COOR_{16}$, or —$CONR_{17}R_{18}$ radical;
$R_{14}$=$C_1$–$C_8$ alkyl radical, which can be aromatic, aliphatic, cyclic, straight chain or branched;
$R_{15}$=$C_1$–$C_{24}$ alkyl radical;
$R_{16}$=$C_1$–$C_8$ alkyl radical, which can be aromatic, aliphatic, cyclic, straight chain or branched;
$R_{17}$=$C_1$–$C_8$ alkyl radical, which can be aromatic, aliphatic, cyclic, straight chain or branched;
$R_{18}$=$C_1$–$C_8$ alkyl radical, which can be aromatic, aliphatic, cyclic, straight chain or branched; and
I=a halide or sulfate ion.

Representative species within the foregoing general structure include the following wherein the foregoing definitions apply:

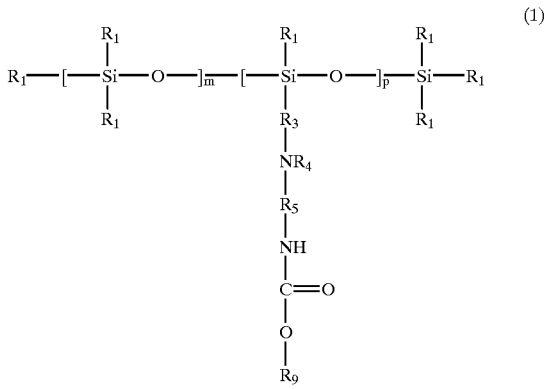

(1)

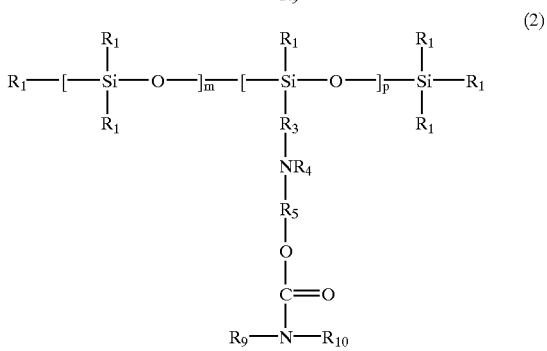

(2)

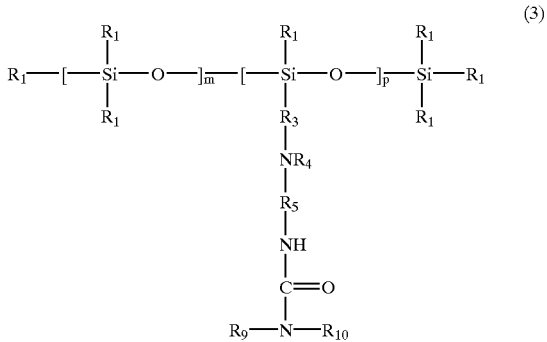

(3)

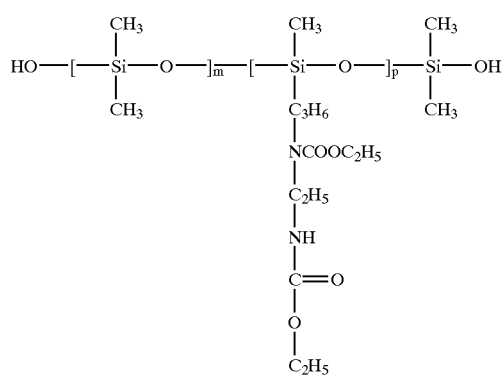

-continued

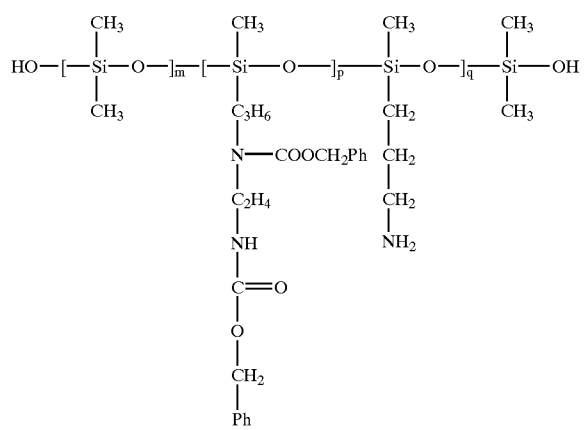
(14)

The derivitized amino-functional polydimethylsiloxanes described above can be applied to the tissue web alone or in conjunction with other chemicals, such as bonders or debonders. They can be applied to the tissue web, particularly an uncreped through-dried web, by spraying or printing. Rotogravure printing of an aqueous emulsion is particularly effective. Add-on amounts can be from about 0.5 to about 15 dry weight percent, based on the weight of the tissue, more specifically from about 1 to about 10 dry weight percent, still more specifically from about 1 to about 5 weight percent, still more specifically from about 2 to about 5 weight percent. The distribution of the deposits of the derivitized amino-functional polydimethylsiloxanes is substantially uniform over the printed surface of the tissue, even though the surface of the tissue, such as in the case of uncreped throughdried tissues, may be highly textured and three-dimensional.

The Wet Out Time (hereinafter defined) for tissues of this invention can be about 15 seconds or less, more specifically about 10 seconds or less, still more specifically about 6 seconds or less, still more specifically about 5 seconds or less, still more specifically from about 4 to about 8 seconds. As used herein, "Wet Out Time" is related to absorbency and is the time it takes for a given sample to completely wet out when placed in water. More specifically, the Wet Out Time is determined by cutting 20 sheets of the tissue sample into 2.5 inch squares. The number of sheets used in the test is independent of the number of plies per sheet of product. The 20 square sheets are stacked together and stapled at each corner to form a pad. The pad is held close to the surface of a constant temperature distilled water bath (23 +/−2° C.), which is the appropriate size and depth to ensure the saturated specimen does not contact the bottom of the container and the top surface of the water at the same time, and dropped flat onto the water surface, staple points down. The time taken for the pad to become completely saturated, measured in seconds, is the Wet Out Time for the sample and represents the absorbent rate of the tissue. Increases in the Wet Out Time represent a decrease in absorbent rate.

The "Differential Wet Out Time" is the difference between the Wet Out Times of a tissue sample treated with a derivitized amino-functional polydimethylsiloxane and a control tissue sample which has not been treated. The Differential Wet Out Time, for purposes of this invention, can be about 10 seconds or less, more specifically about 5 seconds or less, still more specifically about 3 seconds or less, still more specifically about 2 seconds or less, and still more specifically about 1 second or less.

The ratio of the Differential Wet Out Time to the add-on amount of the derivitized amino-functional polydimethylsiloxane can be about 3 seconds per weight percent or less, more specifically about 1 second per weight percent or less, still more specifically about 0.5 second per weight percent or less.

Tissue sheets useful for purposes of this invention can be creped or uncreped. Such tissue sheets can be used for facial tissues, bath tissues or towels. They can have one, two, three or more plies. The basis weight of the tissue product can be from about 25 to about 50 grams per square meter. If used for bath tissue, a single ply tissue having a basis weight of from about 30–40 grams per square meter is particularly suitable.

DETAILED DESCRIPTION OF THE DRAWINGS

Figure 1:
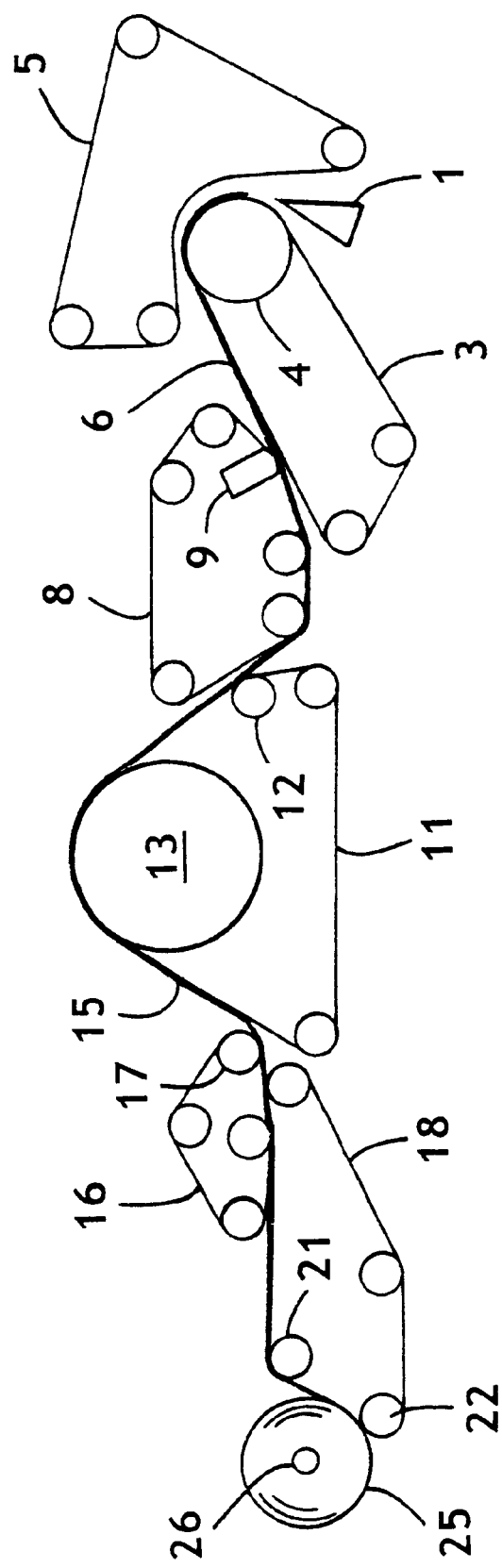
FIG. 1 is a schematic diagram of an uncreped through-dried process for making bath tissue in accordance with this invention.

Referring to FIG. 1, shown is a schematic flow diagram of a through drying process for making uncreped throughdried tissue sheets. Shown is the headbox 1 which deposits an aqueous suspension of papermaking fibers onto an inner forming fabric 3 as it traverses the forming roll 4. Outer forming fabric 5 serves to contain the web while it passes over the forming roll and sheds some of the water. The wet web 6 is then transferred from the inner forming fabric to a wet end transfer fabric 8 with the aid of a vacuum transfer shoe 9. This transfer is preferably carried out with the transfer fabric traveling at a slower speed than the forming fabric (rush transfer) to impart stretch into the final tissue sheet. The wet web is then transferred to the throughdrying fabric 11 with the assistance of a vacuum transfer roll 12. The throughdrying fabric carries the web over the throughdryer 13, which blows hot air through the web to dry it while preserving bulk. There can be more than one throughdryer in series (not shown), depending on the speed and the dryer capacity. The dried tissue sheet 15 is then transferred to a first dry end transfer fabric 16 with the aid of vacuum transfer roll 17. The tissue sheet shortly after transfer is sandwiched between the first dry end transfer fabric and the transfer belt 18 to positively control the sheet path. The air permeability of the transfer belt is lower than that of the first dry end transfer fabric, causing the sheet to naturally adhere to the transfer belt. At the point of separation, the sheet follows the transfer belt due to vacuum action. Suitable low air permeability fabrics for use as transfer belts include, without limitation, COFPA Mononap NP 50 dryer felt (air permeability of about 50 cubic feet per minute per square foot) and Asten 960C (impermeable to air). The transfer belt passes over two winding drums 21 and 22 before returning to pick up the dried tissue sheet again. The sheet is transferred to the parent roll 25 at a point between the two winding drums. The parent roll is wound onto a reel spool 26, which is driven by a center drive motor.

Particularly suitable methods of producing uncreped throughdried basesheets for purposes of this invention are described in U.S. Pat. No. 6,017,417 issued Jan. 25, 2000 to Wendt et al. and U.S. Pat. No. 5,944,273 issued Aug. 31, 1999 to Lin et al., both of which are herein incorporated by reference.

Figure 2:
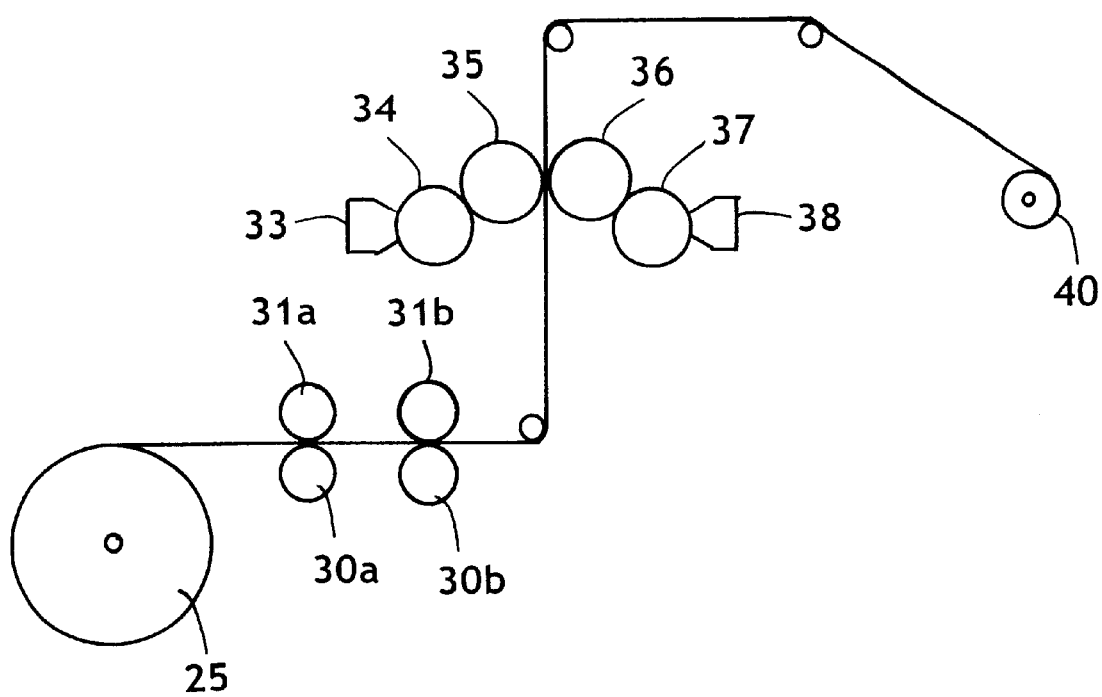
FIG. 2 is a schematic diagram of the post-manufacturing method of handling the uncreped throughdried web and the rotogravure coating process used to apply the derivitized amino-functional polydimethylsiloxane emulsion in accordance with this invention.

FIG. 2 illustrates a suitable method for applying the derivitized amino-functional polydimethylsiloxane to the tissue basesheet. Shown is the parent roll 25 being unwound and passed through two calender nips between calender rolls 30a and 31a and 30b and 31b. The calendered web is then passed to the rotogravure coating station comprising a first closed doctor chamber 33 containing the hydrophilically-modified amino-functional polydimethylsiloxane emulsion to be applied to a first side of the web, a first engraved steel gravure roll 34, a first rubber backing roll 35, a second rubber backing roll 36, a second engraved steel gravure roll 37 and a second closed doctor chamber 38 containing the derivitized amino-functional polydimethylsiloxane emulsion to be applied to the second side of the web. If both sides of the web are to be treated, the two emulsions can be the same or different. The calendered web passes through a fixed-gap nip between the two rubber backing rolls where the derivitized amino-functional polydimethylsiloxane emulsion is applied to the web. The treated web is then passed to the rewinder where the web is wound onto logs 40 and slit into rolls of bath tissue.

EXAMPLES

Example 1

In order to further illustrate this invention, an uncreped throughdried tissue is produced using the methods described in FIGS. 1 and 2 and treated with a derivitized amino-functional polydimethylsiloxane as set forth in structure (4) described herein above.

More specifically, a single-ply, three-layered uncreped throughdried bath tissue is made using eucalyptus fibers for the outer layers and softwood fibers for the inner layer. Prior to pulping, a quaternary ammonium softening agent (C-6027 from Goldschmidt Corp.) is added at a dosage of 4.1 kg/Mton of active chemical per metric ton of fiber to the eucalyptus furnish. After allowing 20 minutes of mixing time, the slurry is dewatered using a belt press to approximately 32% consistency. The filtrate from the dewatering process is either sewered or used as pulper make-up water for subsequent fiber batches but not sent forward in the stock preparation or tissue making process. The thickened pulp containing the debonder is subsequently re-dispersed in water and used as the outer layer furnishes in the tissue-making process.

The softwood fibers are pulped for 30 minutes at 4 percent consistency and diluted to 3.2 percent consistency after pulping, while the debonded eucalyptus fibers are diluted to 2 percent consistency. The overall layered sheet weight is split 30%/40%/30% among the eucalyptus/refined softwood/eucalyptus layers. The center layer is refined to levels required to achieve target strength values, while the outer layers provided the surface softness and bulk. Parez 631NC is added to the center layer at 2–4 kilograms per tonne of pulp based on the center layer.

A three layer headbox is used to form the wet web with the refined northern softwood kraft stock in the two center layers of the headbox to produce a single center layer for the three-layered product described. Turbulence-generating inserts recessed about 3 inches (75 millimeters) from the slice and layer dividers extending about 1 inch (25.4 millimeters) beyond the slice are employed. The net slice opening is about 0.9 inch (23 millimeters) and water flows in all four headbox layers are comparable. The consistency of the stock fed to the headbox is about 0.09 weight percent.

The resulting three-layered sheet is formed on a twin-wire, suction form roll, former with the two forming fabrics being a Lindsay 2164 and an Asten 867a fabric. The speed of the forming fabrics is 11.9 meters per second. The newly-formed web is then dewatered to a consistency of about 20–27 percent using vacuum suction from below the forming fabric before being transferred to the transfer fabric, which is travelling at 9.1 meters per second (30% rush transfer). The transfer fabric is an Appleton Wire T807-1. A vacuum shoe pulling about 6–15 inches (150–380 millimeters) of mercury vacuum is used to transfer the web to the transfer fabric.

The web is then transferred to a throughdrying fabric (Lindsay Wire T1205-1). The throughdrying fabric is travelling at a speed of about 9.1 meters per second. The web is carried over a Honeycomb throughdryer operating at a temperature of about 350° F. (175° C.) and dried to final dryness of about 94–98 percent consistency. The resulting uncreped tissue sheet is then wound into a parent roll.

The parent roll is then unwound and the web is calendered twice. At the first station the web is calendered between a steel roll and a rubber covered roll having a 4 P&J hardness. The calender loading is about 90 pounds per lineal inch (pli). At the second calendering station, the web is calendered between a steel roll and a rubber covered roll having a 40 P&J hardness. The calender loading is about 140 pli. The thickness of the rubber covers is about 0.725 inch (1.84 centimeters).

The calendered single-ply web is then fed into the rubber-rubber nip of the rotogravure coater to apply the derivitized amino-functional polydimethylsiloxane (structure (4)) emulsion to both sides of the web. The aqueous emulsion contains 40% of a derivitized amino polydimethylsiloxane, 8% surfactant, 0.5% antifoaming agent, 0.2% preservative, and the balance water. The gravure rolls are electronically engraved, chrome over copper rolls supplied by Specialty Systems, Inc., Louisville, Ky. The rolls have a line screen of 200 cells per lineal inch and a volume of 6.0 Billion Cubic Microns (BCM) per square inch of roll surface. Typical cell dimensions for this roll are 140 microns in width and 33 microns in depth using a 130 degree engraving stylus. The rubber backing offset applicator rolls are a 75 Shore A durometer cast polyurethane supplied by American Roller Company, Union Grove, Wis. The process is set up to a condition having 0.375 inch interference between the gravure rolls and the rubber backing rolls and 0.003 inch clearance between the facing rubber backing rolls. The simultaneous offset/offset gravure printer is run at a speed of 2000 feet per minute using gravure roll speed adjustment (differential) to meter the polysiloxane emulsion to obtain the desired addition rate. The gravure roll speed differential used for this example is 1000 feet per minute. This process yields an add-on level of 2.5 weight percent total add-on based on the weight of the tissue. The tissue is then converted into bath tissue rolls. Sheets from the bath tissue rolls have a silky, lotiony hand feel and a Wet Out Time of 5.5 seconds. (Similarly made tissues without the treatment of this invention had a Wet Out Time of about 4.0 seconds.) The ratio of the differential Wet Out Time to the weight percent add-on amount is 0.6.

Example 2

An uncreped throughdried tissue is made substantially as described above with the following exceptions: (1) the overall layered weight is split 30%/40%/30% among the eucalyptus/refined softwood/eucalyptus layers; (2) no Parez is added to the center layer; (3) the add-on level of the derivitized amino-functional polydimethylsiloxane is 2.5 weight percent; (4) the structure of the hydrophilically-modified amino-functional polydimethylsiloxane is as set forth in structure (6) herein above; and (5) the derivitized amino-functional polydimethylsiloxane constitutes 30 weight percent of the aqueous emulsion used to deliver the derivitized amino-functional polydimethylsiloxane to the tissue. The resulting bath tissue product obtained has a silky, lotiony hand feel and a Wet Out Time of 6 seconds.

Example 3

An uncreped throughdried tissue is produced similarly as described in Example 1 with the following exceptions: (1) prior to pulping, a polydimethylsiloxane of structure (8) is added to the eucalyptus fibers at a dosage of 0.2 kg/Mton of active chemical per metric ton of fiber; (2) the add-on level of the derivitized amino-functional polydimethylsiloxane is 1.5 weight percent; (3) the structure of the derivitized amino-functional polydimethylsiloxane printed onto the tissue is as set forth in structure 14 herein above; and (4) the derivitized amino-functional polydimethylsiloxane constitutes 20 weight percent of the aqueous emulsion used to deliver the derivitized amino-functional polydimethylsiloxane to the tissue. The resulting bath tissue product obtained has a silky, lotiony hand feel and a Wet Out Time of 7 seconds.

It will be appreciated that the foregoing example and discussion is for purposes of illustration only and is not to be construed as limiting the scope of this invention, which is defined by the following claims and all equivalents thereto.

I claim:

1. A tissue having a Wet Out Time of about 15 seconds or less and containing at least about 2 dry weight percent of a hydrophilically-modified amino-functional polysiloxane having the following structure:

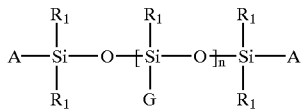

wherein:

"A" is selected from the group consisting of hydroxy; $C_1$–$C_6$ alkyl radical; or C1–C6 alkoxyl radical, which can be straight chain, branched or cyclic, unsubstituted or substituted; or a "B".

$R_1$=a $C_1$–$C_6$ alkyl radical, which can be straight chain, branched or cyclic;

$G=(R_1)_m+(B)_p+(D)_q$ with $R_1$, B and D distributed in random or block fashion;

m=20–100,000;
p=1–5,000;
q=0–5,000;
m+p+q=n;

$B$=—$(R_3$—N—$R_4)_t$—$R_5$—W
wherein
t=0 or 1;
$R_3$=a $C_2$–$C_8$ alkylene diradical, which can be straight chain or branched, substituted or unsubstituted;
$R_4$=a hydrogen or $C_1$–$C_8$ alkyl radical, which can be straight chain or branched, substituted or unsubstituted or a $R_6$;

$R_5$=a $C_2$–$C_8$ alkylene diradical, which can be straight chain or branched, substituted or unsubstituted;
W=—N—$R_6R_7$; $OCONR_9R_{10}$;
wherein
$R_6$=a radical of hydrogen, $COOR_8$, or $CONR_9R_{10}$;
$R_7$=a radical $COOR_8$, or $CONR_9R_{10}$;
$R_8$=a $C_1$–$C_{10}$ alkyl radical, which can be straight chain, branched or cyclic, substituted or unsubstituted, aliphatic or aromatic;
$R_9$=hydrogen or a $C_1$–$C_{10}$ alkyl radical, which can be straight chain, branched or cyclic, substituted or unsubstituted, aliphatic or aromatic;
$R_{10}$=hydrogen or a $C_1$–$C_{10}$ alkyl radical, which can be straight chain, branched or cyclic, substituted or unsubstituted, aliphatic or aromatic;

D=—$R_{11}$—Y,
wherein
$R_{11}$=a $C_2$–$C_6$ alkylene diradical;
Y=—$NR_{12}R_{13}$, —$OSO_3R_{14}$, or —$[N^+R_{14}R_{16}SO_2PhR_{15}]I^-$ where Ph is a phenyl radical;
wherein
$R_{12}$=hydrogen, $C_1$–$C_8$ alkyl, $COOR_{16}$, or —$CONR_{17}R_{18}$ radical;
$R_{13}$=hydrogen, $C_1$–$C_8$ alkyl, $COOR_{16}$, or —$CONR_{17}R_{18}$ radical;
$R_{14}$=$C_1$–$C_8$ alkyl radical, which can be aromatic, aliphatic, cyclic, straight chain or branched;
$R_{15}$=$C_1$–$C_{24}$ alkyl radical;
$R_{16}$=$C_1$–$C_8$ alkyl radical, which can be aromatic, aliphatic, cyclic, straight chain or branched;
$R_{17}$=$C_1$–$C_8$ alkyl radical, which can be aromatic, aliphatic, cyclic, straight chain or branched;
$R_{18}$=$C_1$–$C_8$ alkyl radical, which can be aromatic, aliphatic, cyclic, straight chain or branched;
and
I=a halide or sulfate ion.

2. The tissue of claim 1 wherein the Wet Out Time is about 10 seconds or less.

3. The tissue of claim 1 wherein the Wet Out Time is about 7 seconds or less.

4. The tissue of claim 1 wherein the Wet Out Time is about 5 seconds or less.

5. The tissue of claim 1 wherein the Wet Out Time is from about 4 to about 8 seconds.

6. The tissue of claim 1 having from about 0.5 to about 15 dry weight percent of the derivitized amino-functional polysiloxane.

7. The tissue of claim 1 having from about 1 to about 10 dry weight percent of the derivitized amino-functional polysiloxane.

8. The tissue of claim 1 having from about 1 to about 5 dry weight percent of the derivitized amino-functional polysiloxane.

9. The tissue of claim 1 having from about 2 to about 5 dry weight percent of the derivitized amino-functional polysiloxane.

10. The tissue of claim 1 wherein the ratio of the Differential Wet Out Time to the add-on amount of the derivitized amino-functional polysiloxane is about 3 seconds per weight percent or less.

11. The tissue of claim 1 wherein the ratio of the Differential Wet Out Time to the add-on amount of the derivitized amino-functional polysiloxane is about 1 second per weight percent or less.

12. The tissue of claim 1 wherein the ratio of the Differential Wet Out Time to the add-on amount of the derivitized amino-functional polysiloxane is about 0.5 second per weight percent or less.

13. The tissue of claim 1 wherein the tissue is an uncreped throughdried tissue.

14. The tissue of claim 1 wherein both sides of the tissue are printed with the same derivitized amino-functional polysiloxane.

15. The tissue of claim 1 wherein the derivitized amino-functional polysiloxane printed on one side of the tissue is different than the derivitized amino-functional polysiloxane printed on the other side of the tissue.

16. The tissue of claim 1 wherein $W=NR_6R_7$.

17. The tissue of claim 1 wherein $W=OCONR_9R_{10}$.

18. The tissue of claim 1 wherein $A=B$.

19. The tissue of claim 1 wherein $q=0$.

20. The tissue of claim 1 wherein $(R_6=R_7=COOR_8)$.

21. The tissue of claim 1 wherein $(R_6=R_7=CONR_9R_{10})$.

22. The tissue of claim 1 wherein the derivitized amino-functional polysiloxane has the following structure:

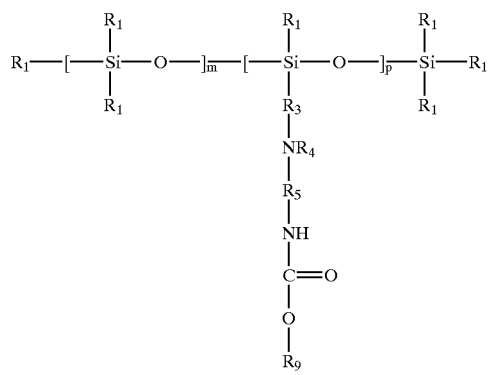

23. The tissue of claim 1 wherein the derivitized amino-functional polysiloxane has the following structure:

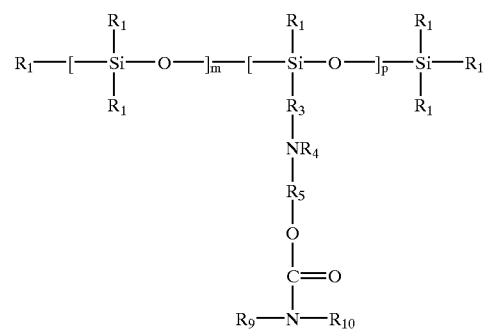

24. The tissue of claim 1 wherein the derivitized amino-functional polysiloxane has the following structure:

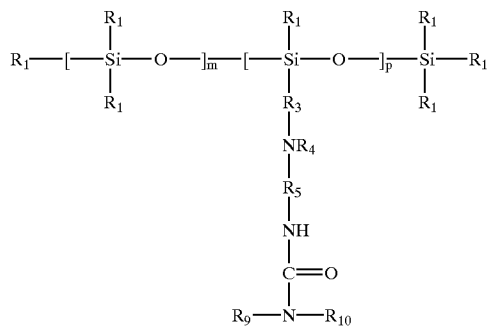

25. The tissue of claim 1 wherein the derivitized amino-functional polysiloxane has the following structure:

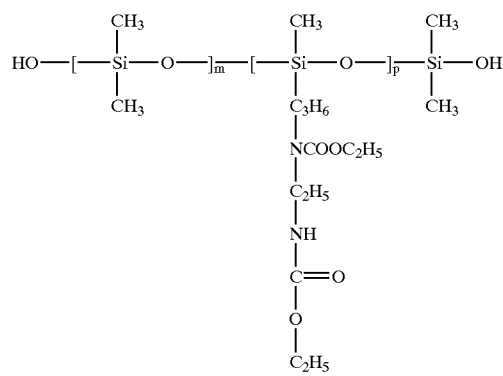

26. The tissue of claim 1 wherein the derivitized amino-functional polysiloxane has the following structure:

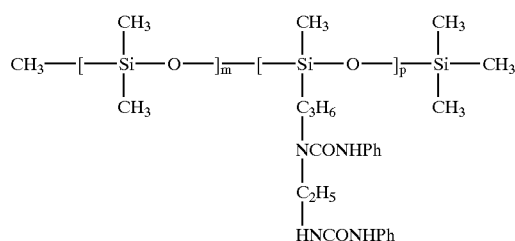

27. The tissue of claim 1 wherein the derivitized amino-functional polysiloxane has the following structure:

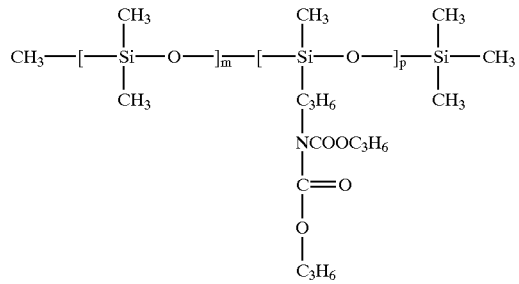

28. The tissue of claim 1 wherein the derivitized amino-functional polysiloxane has the following structure:

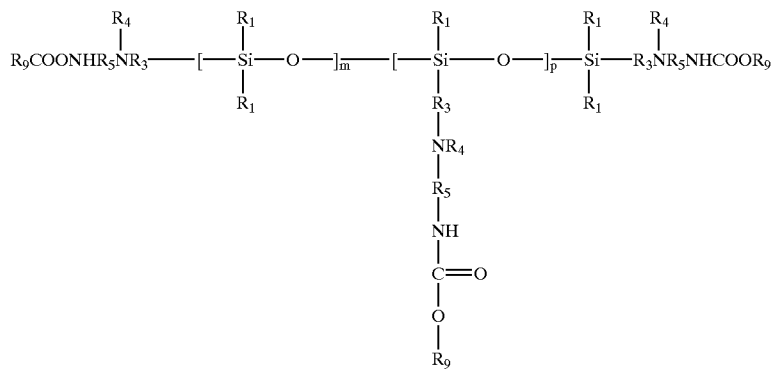

29. The tissue of claim 1 wherein the derivitized aminofunctional polysiloxane has the following structure:

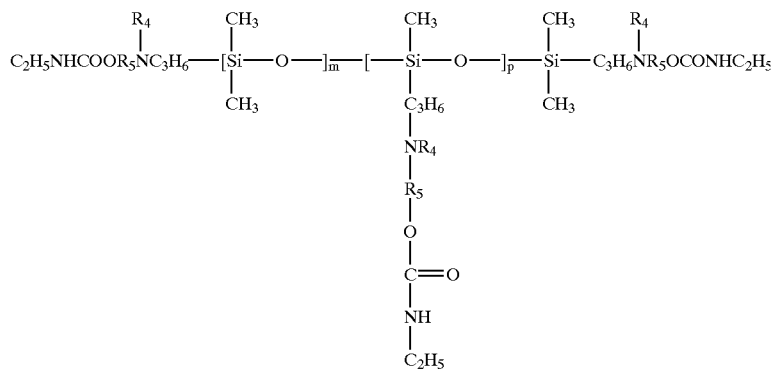

30. The tissue of claim 1 wherein the derivitized aminofunctional polysiloxane has the following structure:

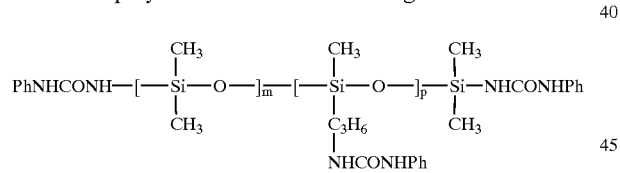

31. The tissue of claim 1 wherein the derivitized aminofunctional polysiloxane has the following structure:

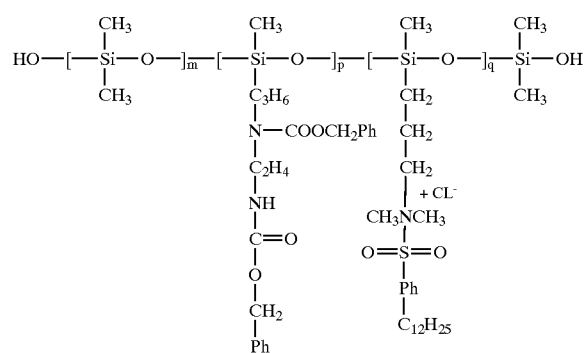

32. The tissue of claim 1 wherein the derivitized aminofunctional polysiloxane has the following structure:

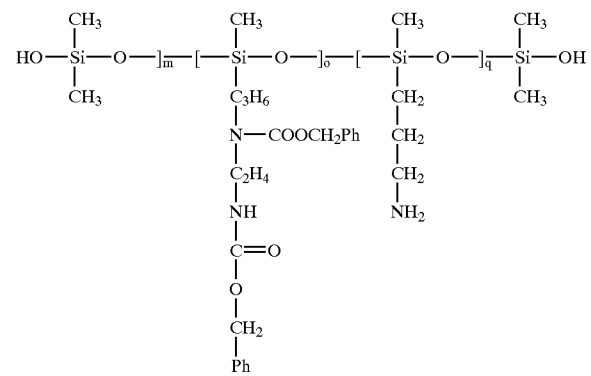

* * * * *